Nov. 30, 1926.

J. FIEUX 1,608,553

TORQUE LIMITING DEVICE FOR CLUTCHES

Filed Oct. 21, 1924  2 Sheets-Sheet 2

Patented Nov. 30, 1926.

1,608,553

UNITED STATES PATENT OFFICE.

JEAN FIEUX, OF PARIS, FRANCE, ASSIGNOR TO SOCIETE ANONYME LES APPAREILS FIEUX, OF PARIS, FRANCE, A FRENCH COMPANY.

TORQUE-LIMITING DEVICE FOR CLUTCHES.

Application filed October 21, 1924, Serial No. 744,970, and in France November 5, 1923.

The subject matter of the present invention is a device for limiting the torque by friction between the driving and driven elements of a mechanical power transmission system. With the assistance of a controlled clutch, a compound clutch, possessing remarkable qualities of reliability and durability, can be obtained.

In this compound clutch, a function of the element for limiting the torque is to assure during the clutching action an extremely regular movement.

The new device is of the known kind wherein one element of the transmission system comprises a drum engaged by a helical spring adapted to exert radial frictional pressure on said drum, one end of which spring is connected directly to the second element of the system while the other end is connected thereto by resilient means, conveniently adjustable, which by acting tangentially on said spring produce radial pressure thereby only sufficient for firm frictional engagement up to a predetermined torque transmitted from element to element.

In the torque limiting device according to the present invention the element comprising the drum is the driving element of the system and the helical spring bears on the inside of this drum and is connected at its ends respectively to two disc-like members concentrically mounted with respect to, and conveniently freely rotatable round, the shaft of the driving element, one of which members constitutes the driven element of the system while the other is connected by the resilient means, such as helical compression springs, to this element.

In a practical embodiment of the invention the driven element aforesaid constitutes the driving element of a controlled clutch incorporated with the device, so that the latter then conveniently serves as a starting torque limiting device.

The starting torque limiting device, the new design of which constitutes an important characteristic feature of the invention, utilizes as hitherto described the action of the helical spring bearing on the inside of the drum which is integral with the driving shaft. The pressure exerted on the friction surfaces is due to the thrust exerted on the ends of the helical spring by the two disc-like members or discs which have a tendency to assume a position of angular displacement in relation to one another under the action of an elastic system connected between driving and driven discs. The resilient or compression means employed in said system are adjusted in such manner that the moment of displacement of the discs which exert a thrusting action on the ends of the helical spring is greater than the required starting torque by a suitable quantity which is dependent on the average value of the coefficient of friction as well as on the arc of coiling of the helical spring.

As stated, one of the discs which act on the helical spring is not connected directly either with the driving shaft or with the driven system. Its position of equilibrium is brought about by the action of the compression means of the elastic system, on the one hand, and by the reaction of the end of the helical spring by which the said disc is supported, on the other hand. This disc bears the name "oscillating disc". The second disc which acts on the helical spring constitutes the driven element proper of the torque limiting device, by means of which the system to be finally driven is thrown into gear through the intermediary of a controlled clutch. The position of equilibrium of this disc is brought about by the action of the compression means of the elastic system, on the one hand, and by the reaction of the driven element of the controlled clutch due to a compression spring which influences this element. Said second disc bears the name "driven disc". The direction of the coiling up of the helical spring is such, that a line drawn from the driven disc along the windings of the said helical spring to the oscillating disc would have to revolve round the shafting in the direction of rotation of the driving drum. A study of the forces in action in the starting torque limiting system thus constituted leads to the following formula:—

$$F = Q\left(1 - \frac{1}{e}fa\right)$$

in which F is the tangential friction measured on the friction drum. Q is the action exerted by the oscillating disc on the end of the helical spring, expressed in the same units as F, and the said helical spring being presumed to be of negligible thickness; e is the figure 2.71828, the base of the Napierian logarithms; $f$ is the coefficient of friction on the friction surfaces; $a$ is the arc of coiling of the helical spring expressed in radians.

When this formula is applied it is shown that the variations of the coefficient of friction have a comparatively small influence on the working of the torque limiting device. If the case of a helical spring with four coils is considered, it is found that the value of the starting effort transmitted varies only in the ratio of about 1 to 1.13, when the value of the coefficient of friction passes from .08 to .16, thus varying in the ratio of 1 to 2.

To this quality of accuracy is added a further advantage of great resistance of the friction surfaces to wear and tear, the said surfaces in practice being copiously lubricated and kept in perfect contact with each other.

A description of a compound clutch designed in accordance with the invention is given below by way of example.

With reference to the accompanying drawings:—

Figure 1:
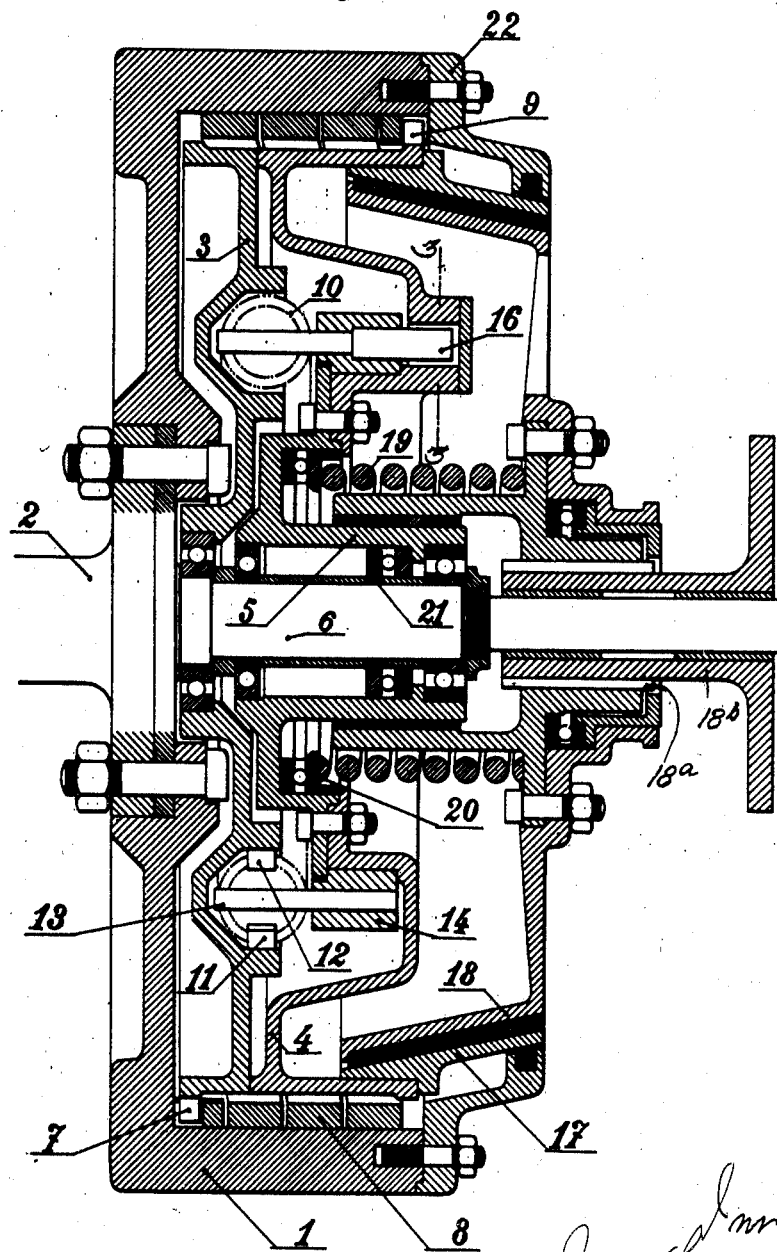
Figure 1 is an axial section of the device.
Figure 2:
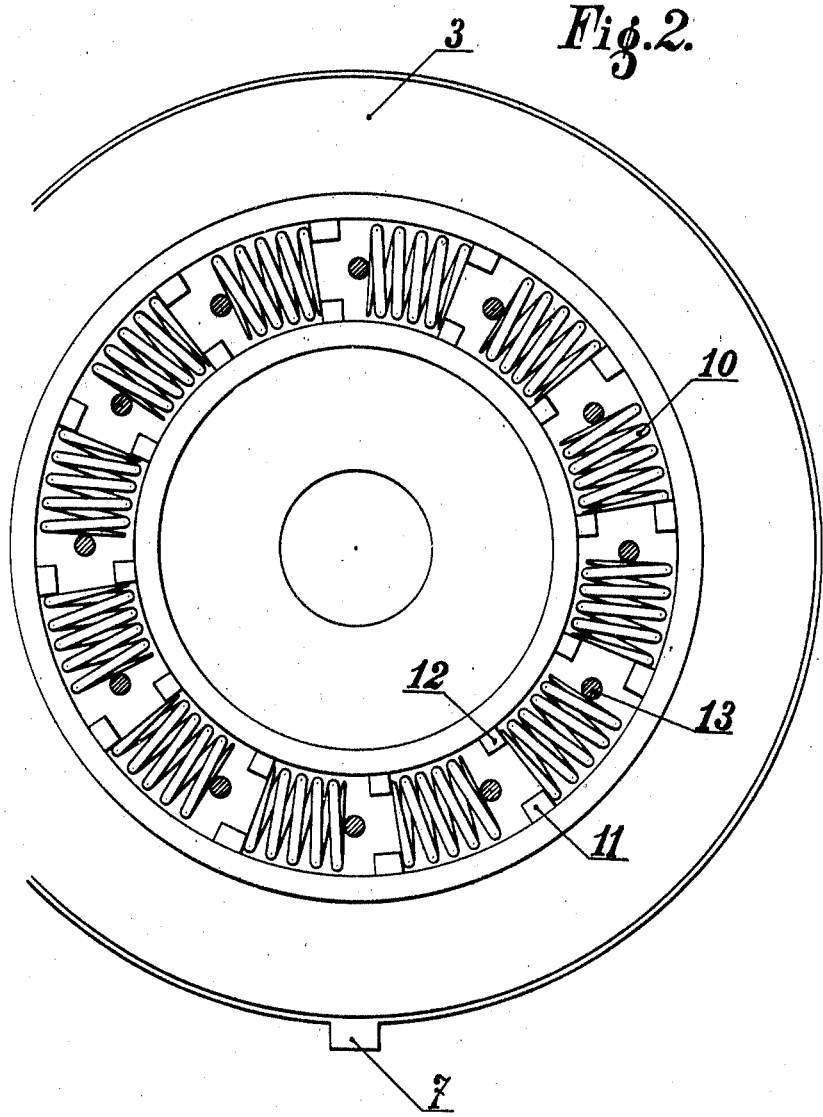
Figure 2 is a plan of the oscillating disc and the elastic system, from the driven side.

Drum 1, which acts as a fly-wheel, is fixed on the driving shaft 2. Oscillating disc 3 and driven disc 4 mounted on its hub 5 are rotatable independently on journal 6 which constitutes an extension of the driving shaft. Projection 7 of the oscillating disc fits in a recess made at one end of the helical spring 8. Projection 9 of the driven disc fits in a recess made at the other end of the helical spring. The direction of coiling up of the latter is left-handed, the direction of rotation of the drum, viewed from the driven side, being assumed to be anti-clockwise.

Figure 3:
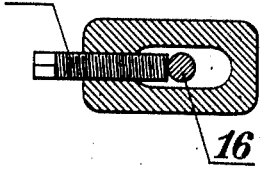
Figure 3 is a detail section through 3—3, through the boss of the driven disc which carries the adjustment screw.

A number of springs 10 acting in compression are supported, at only one end, by projections 11 and 12 of the oscillating disc, and at their other end, by dogs 13 which are integral with the annular crown 14, which is fitted concentrically on the driven disc. A suitable adjustment of the compression springs is obtained by angular displacement of the crown 14 on disc 4 by means of screw 15 (see Figure 3), which constitutes the adjustable stop of projection 16 which is rigidly mounted in the crown. The stops 11 and 12 tend to press each spring in the direction of rotation of the apparatus towards dog 13 which serves, as stated, to adjust this spring.

A female cone 17, fixed on the driven disc 4, transmits by friction the starting torque to the male cone 18 of a controlled clutch, which is splined as at $18^a$ on the driven shaft $18^b$ and influenced by a spring 19 through the intermediary of the ball thrust-bearing 20 mounted on hub 5, which, in its turn bears on the driving shaft through the intermediary of the ball thrust-bearing 21.

A shield 22, which is fast on the drum 1 completely houses or closes the starting torque limiting device.

Accessibility is provided for by means of three openings cut into the male cone of the positively controlled coupling, as shown in Fig. 1 near the reference character 16.

As to the operation of the apparatus, the direction at which the latter acts in order to limit the couple or torque is the direction in which a movable element must turn following a screw thread in order to travel from the driven disc to the oscillating disc.

The reactions on the projections 7 and 9 are equal in absolute values if there is no load placed on it for transmission, if there is no motive couple or torque. On the other hand, however, where there is a transmission of torque these reactions are unequal. The reaction on the projection 7 is the only one which maintains its value while the reaction on the projection 9 decreases in inverse proportion to the force transmitted. There is an instant where this reaction is just sufficient to cause the friction on the drum corresponding to the maximum torque which it is desired to transmit.

It should be noted that the motive force passes through the fly-wheel 1, that it is transmitted through friction to the spiral 8, then by means of the projection 7 to the plate 3, then by the annular system of springs 10 through the projections 11 and 12, a dog 13, the ring 14 to the plate 4, the female cone 17 and finally to the male receiving cone 18.

I claim:—

1. A torque limiting device comprising in combination with a driving drum, a helical spring adapted to bear on the inside of said drum, a driven element concentric with said drum, one end of said spring being connected directly to said driven element, and resilient means connected between the other end of said spring and the driven element for acting tangentially on said spring to force the same normally into engagement with said drum to exert a predetermined pressure thereon, of an oscillating disc coaxial with said drum and driven by the connection between said other end of the helical spring and said driven element.

2. A torque limiting device comprising in combination with a driving drum, a helical spring adapted to bear on the inside of said drum, a driven element concentric with said drum, one end of said spring being connected directly to said driven element, and compression means connected between the other end of said spring and the driven element for acting tangentially on said spring to force the same normally into engagement with said drum to exert a predetermined pressure thereon, of an oscillating disc coaxial with said drum and driven by the connection between said other end of the helical spring and said driven element.

3. A torque limiting device comprising in combination with a driving drum, a helical spring adapted to bear on the inside of said drum, a driven disc concentric with said drum, one end of said spring being connected directly to said driven disc, and compression means connected between the other end of said spring and the driven disc for acting tangentially on said spring to force the same normally into engagement with said drum to exert a predetermined pressure thereon, of an oscillating disc coaxial with said drum and connected between said other end of the helical spring and said compression means.

4. A torque limiting device comprising in combination a driving shaft having an extension, a driving drum fast on said shaft, a helical spring adapted to bear on the inside of said drum, a driven disc concentric with said drum, one end of said spring being connected to said driven disc, compression means connected between the other end of said spring and the driven disc for acting tangentially on said spring to force the same normally into engagement with said drum to exert a predetermined pressure thereon, and an oscillating disc coaxial with said drum and connected between said other end of the helical spring and said driven disc, the latter and said oscillating disc being freely rotatable on said extension of the driving shaft.

5. A torque limiting device comprising in combination with a driving drum, a helical spring adapted to bear on the inside of said drum, a driven element concentric with said drum, one end of said spring being connected directly to said driven element and compression means connected between the other end of said spring and the driven element for acting tangentially on said spring to force the same normally into engagement with said drum to exert a predetermined pressure thereon, of an oscillating disc coaxial with said drum and driven by the connection between said other end of the helical spring and said driven element, said compression means consisting of an annular row of compression springs.

6. A torque limiting device comprising in combination with a driving drum, a helical spring adapted to bear on the inside of said drum, a driven element concentric with said drum, one end of said spring being connected directly to said driven element, and compression means connected between the other end of said spring and the driven element for acting tangentially on said spring to force the same normally into engagement with said drum to exert a predetermined pressure thereon, of an oscillating disc coaxial with said drum and driven by the connection between said other end of the helical spring and said driven element, said compression means consisting of an annular row of adjustable compression springs.

7. A starting torque limiting device comprising in combination a driving drum, a helical spring adapted to bear on the inside of said drum, a driven disc concentric with said drum, one end of said spring being connected directly to said driven disc, compression means connected between the other end of said spring and the driven disc for acting tangentially on said spring to force the same normally into engagement with said drum, an oscillating disc coaxial with said drum and connected between said other end of the helical spring and said compression means, and a controlled clutch comprising a spring-influenced driven disc frictionally driven by the first driven disc.

8. A starting torque limiting device comprising in combination a driving shaft having an extension, a driving drum fast on said shaft, a helical spring adapted to bear on the inside of said drum, a driven disc concentric with said drum, one end of said spring being connected directly to said driven disc, compression means connected between the other end of said spring and the driven disc for acting tangentially on said spring to force the same normally into engagement with said drum, an oscillating disc coaxial with said drum and connected between said other end of the helical spring and said compression means, and a controlled clutch comprising a driven shaft and a spring-influenced disc splined thereto and frictionally driven by said driven disc, the latter, said oscillating disc and said driven shaft being freely rotatable on said extension of the driving shaft.

9. A starting torque limiting device comprising in combination a driving drum, a helical spring adapted to bear on the inside of said drum, a driven disc concentric with said drum, one end of said spring being connected directly to said driven disc, compression means connected between the other end of said spring and the driven disc for acting tangentially on said spring to force the same normally into engagement with said drum, an oscillating disc coaxial with said drum and connected between said other end of the helical spring and said compression means, and a controlled clutch comprising a second driven disc adapted frictionally to engage the first driven disc and means comprising a helical spring concentric with the driving drum and driven discs for forcing said second and first driven discs into frictional engagement.

10. A starting torque limiting device comprising in combination a driving drum, a helical spring adapted to bear on the inside of said drum, a driven disc concentric with said drum, and having a conical friction face, one end of said spring being connected directly to said driven disc, compression means connected between the other end of said spring and the driven disc for acting tangentially on said spring to force the same normally into engagement with said drum, an oscillating disc coaxial with said drum and connected between said other end of the helical spring and said compression means, and a controlled clutch comprising a second driven disc having a conical friction face corresponding with the aforesaid conical friction face and means comprising a helical spring concentric with the driving drum and driven discs for forcing said friction faces into engagement.

11. A starting torque limiting device comprising in combination a driving element including a disc and a drum integrally united, an annular member fast on said drum and extending from its end remote from the disc, a helical spring adapted to bear on the inside of said drum, a driven disc concentrically mounted within said drum, a second annular member fast on said driven disc and having a conical friction face thereon, one end of said spring being connected directly to said driven disc, compression means connected between the other end of said spring and the driven disc for acting tangentially on said spring to force the same normally into engagement with said drum, an oscillating disc coaxial with and located between the driving and driven discs and connected between said other end of the helical spring and said compression means, and a controlled clutch comprising a second driven disc having an inwardly directed flange with a conical friction face thereon corresponding with the aforesaid friction face and means comprising a compression spring concentric with the driven disc for forcing said friction faces into engagement, the parts being so arranged that the driving element, the annular member extending therefrom, and the second driven disc constitute a housing for the oscillating disc, first driven disc, compression spring and conical friction faces.

12. A starting torque limiting device according to claim 11, comprising means mounted on the first driven disc for adjusting the compression means, the second driven disc being apertured for accessibility to these adjusting means.

In witness whereof I affix my signature.

JEAN FIEUX.